CRAGGS & REYNOLDS.
Grain-Drill.
No. 5,237.  Patented Aug. 14, 1847.
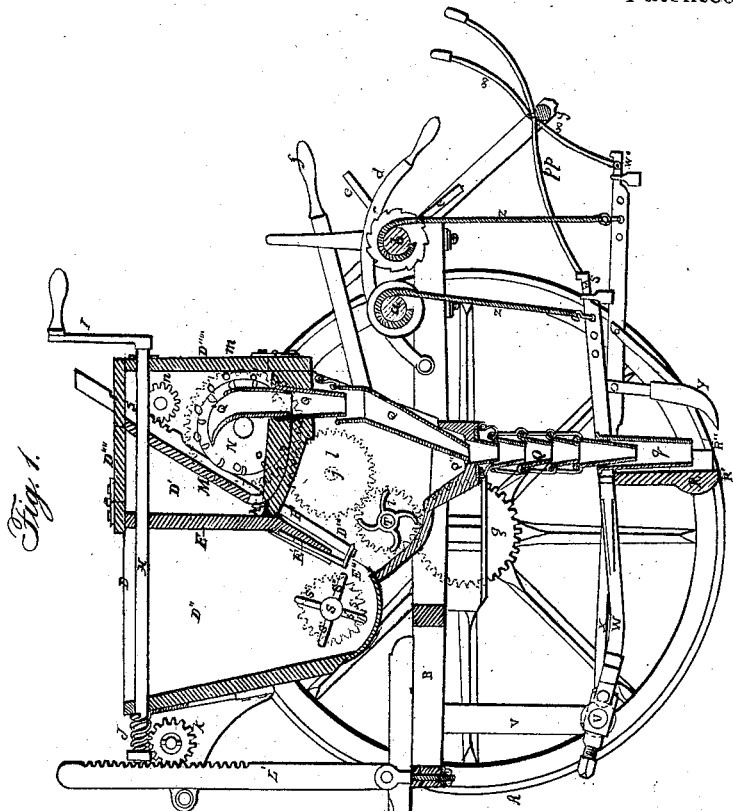
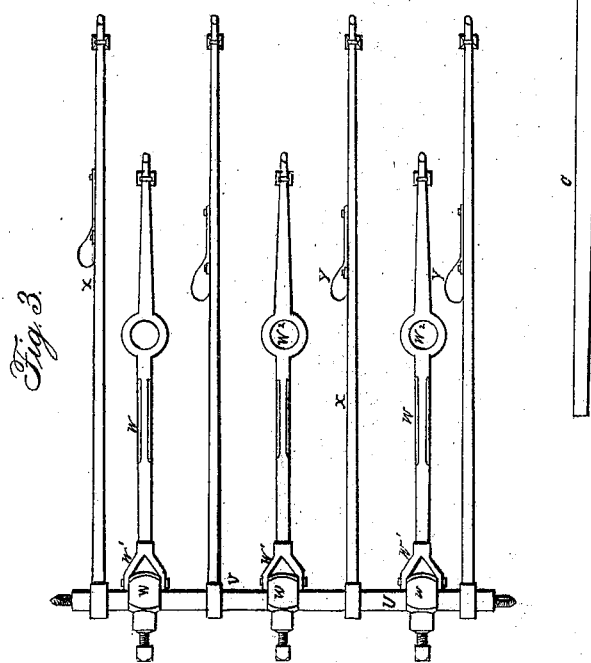
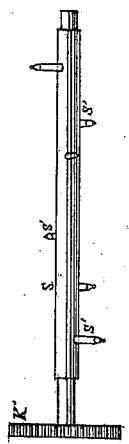

UNITED STATES PATENT OFFICE.

RICHARD CRAGGS, OF WILLIAMSON, AND OLIVER REYNOLDS, OF WEBSTER, NEW YORK.

IMPROVEMENT IN PLANTING-MACHINES.

Specification forming part of Letters Patent No. 5,237, dated August 14, 1847.

*To all whom it may concern:*

Be it known that we, RICHARD CRAGGS, of Williamson, in the county of Wayne, and OLIVER REYNOLDS, of Webster, in the county of Monroe, and State of New York, have invented a new and useful Improvement in the Machine for Cultivating, Drilling, Fertilizing, and Planting, which is described as follows, reference being had to the annexed drawings of the same, making part of this specification.

Figure 1 is a vertical longitudinal section of the machine through the center of the same. Fig. 2 is a plan of the revolving breaker. Fig. 3 is a plan of the parallel bars to which the drills and cultivators are affixed and the transverse bar to which the parallel bars are affixed.

This machine in its general arrangement and construction of parts is made like some other agricultural machines in use.

Our essential improvements are three in number, and are deemed indispensable to the proper action of the machine—namely: First, the addition of the revolving breaker for breaking the manure in the manure-box; second, in making the drills with round points for passing over stones, stumps, and other obstructions with facility; third, in a new mode of arranging the cultivators on separate beams between the drills, so that they shall move independently of each other.

A represents one of the two cart-wheels by which the machine is supported and moved from place to place, made in the usual manner.

B is the frame; C, the shafts to which the horses or other animals for moving the machine are geared; D, the hopper for containing the seed to be planted and the manure for fertilizing the soil and the revolving portions of the machine acting in the same, D' being the portion for containing the seed; D'', the portion for containing the manure to be broken; D''', the portion for receiving the manure after being broken into fine particles.

E is a partition for dividing the manure-apartment from the seed-apartment.

E' is a partition for dividing the apartment to contain the coarse manure from the apartment to contain the fine manure.

E'' is an opening in the partition E', through which the manure, when broken, is discharged into the apartment D'''. E''' is a sliding gate for closing this opening E''.

F is an inclined rod, to which the gate E''' is connected by a pin having cogs in its under edge, into which a pinion, G, gears for moving it up or down in its inclined position for opening or closing the gate. In Fig. 1 the gate is represented as being open.

H is a shaft, having a crank, I, on one end, on which it is turned, and spiral thread J on the other end, working into the teeth of a pinion, K, attached to the hopper, which work into the teeth of a vertical rod, L, connected to the frame by a joint, by which the relative position of the hopper with the frame is altered at pleasure.

M is an inclined partition for dividing the seed-apartment into two parts, one for holding the seed and the other for containing the feeding-wheels N to turn in.

M' is one of the openings in said partition, through which the seed passes to the apartments in which the revolving wheels turn in.

O is a circle of spoons or dippers inserted into the face of the wheel N for dipping the seed and emptying the same into the jointed conveyer Q, that conveys it to the concave sides of the hollow drill R, through which it is conveyed to the furrow in the usual manner.

D'''' is a door through which the seed is introduced to the seed-apartment.

D''''' is another door, by which access is had to the apartment in which the feeding-wheel N revolves.

S is the shaft containing the radial beaters or breakers for breaking, pulverizing, and working the manure into small particles and discharging it through the opening E'' into the hopper D'''.

S' S' are the radial beaters.

T is the revolving shaft, containing a number of curved conveyers for conveying the fine manure into the jointed conveyer along with the seed to be planted, the seed entering at Q' and the manure at Q''.

V is a transverse horizontal round bar affixed to hanging arms V of the frame, to which are attached by loose joints the vibrating beams W and X, to which the hollow round-pointed drills R and the concave cultivators Y are affixed.

Z are cords or chains attached to the beams W and X and wound around rollers $a$ $b$, turning on gudgeons in boxes affixed to the frame.

$c$ is a rag-wheel affixed to the end of the roller $b$.

$d$ is a dog attached to the frame and dropped into the notches of the rag-wheel, for holding it from turning back.

$e$ is a winch for turning the roller $b$. A similar winch for turning the roller $a$ is affixed to its ends, also a ratchet and pawl.

$f$ is a lever for throwing the machine out of gear.

The gearing is a cog-wheel, $g$, on the cart-wheel axle, which meshes into a cog-wheel, $i$, on the axle T of the conveyers, on which there are two cog-wheels, one of which meshes into a cog-wheel on the shaft S of the manure-breakers (not represented in Fig. 1) and the other into an intermediate cog-wheel, $l$, turning on a pin, $j$, inserted into the end of the hopper, which wheel gears with a cog-wheel, $m$, on the shaft of the revolving conveyers N.

$s$ $w$ are weights appended to the beams W X of the drills and cultivators for increasing the bearing of the cultivators and drills. The aforesaid cog-wheels $i$ $l$ $m$ are represented in Fig. 1 by dotted lines.

The construction and arrangement of the above-named parts are described as above merely to give a general understanding of the machine. We make no claim to the invention of any one part except the drills, nor the arrangement of them except the manure pulverizer and discharger and breaker and the manner of arranging the cultivators.

The revolving manure breaker, pulverizer, and conveyer, which is one of the parts intended to be claimed, in combination with the divided hopper, should be composed of a shaft, S, extending entirely through the hopper and beyond the same, turning in suitable boxes, having a cog-wheel on one end geared to a cog-wheel on the shaft of the conveyer, and having a suitable number of radial arms or breakers, $s'$, inserted into it at proper distances apart for the purpose of breaking the manure, and should be arranged in the lower part of the hopper, near the gate leading to the apartment into which the manure is to be discharged, forced, or conveyed when properly broken or pulverized, as well worked up into small particles. The whole should be made of suitable metal in a strong and durable manner.

The drill R should be composed of a bar of wrought-iron, tapered from the upper to the lower end, and rounded on the front or cutting edge to the form of a segment of a circle, for the purpose of passing easily over stones and stumps and hard substances without injury to the machine and for opening the furrow to receive the grain and manure, having two curved rings, $R'$ $R''$, designed to scrape the earth over the seed and to encircle a segment of the tube or seed-conductor $q$, which passes through a round eye, $W^2$, Fig. 3, in the jointed beam W, the upper end of the shank or standard of the said rounded drill having a tenon thereon, which is inserted into a corresponding mortise in the beam, in front of the tube $q$, and riveted fast, there being any convenient number of drills, according to the size of the machine and the width apart of the required furrows, all made alike and attached to the round bar in the same manner by means of adjustable blocks $w$, forks $W'$, and joint-pins and set-screws $x$, for setting the blocks in any required position on the rod U.

The cultivators or teeth Y are made in the usual manner; but they are affixed to separate beams W X, which are attached by eyes to the transverse round bar in front, on which they turn, having their rear ends attached to the roller by chains or cords Z, independently of one another, so that when a cultivator or tooth comes in contact with a stone or stump it may rise and pass over it without affecting the other cultivators and drills, the said beams not being confined in a frame containing the cultivators and drills, as in some machines. Another advantage gained by having each cultivator on a separate vibrating and adjustable beam is that of being able to arrange the cultivators as near together or as far apart as may be required, and have them all to act independently of one another.

The cultivators may be elevated or depressed simultaneously by turning the rollers $b$; or they may be raised or lowered singly by the levers $o$ $o$, attached to their rear ends, whose fulcrum is the transverse bar $y$, attached to the frame, as shown in Fig. 1.

The beams of the drills may be acted on singly and separately by levers $p$ $p$, attached to their rear ends, in the same manner as just described for the cultivators.

The beams of the cultivators may be attached to the transverse bar in the same manner as the beams of the drills by means of adjustable perforated blocks, forks, bolts, and set-screws. The cultivators should be arranged between the drills at the required distance apart and a few inches behind the drills, so that they shall throw up the earth on either side, causing a portion of it to spread over upon the seed and manure and unite with the small ridges formed by the drills, and at the same time form furrows between the ridges containing the seed, for the reception of the water which will be drained into them from the ridges and about them when cultivating low wet soil, which will prevent the seed from being destroyed by rotting in wet rows, and leaving the ridges containing the seed sufficiently dry to produce the required result in the most effective manner.

Previous to planting and fertilizing the soil it must be properly prepared by the cultivators, which must be increased in number by removing the drills and substituting cultivators, which is easily effected by the before-described mode of constructing the beams and combining them with the transverse rod attached to the rear end of the frame, the hopper and its appendages being also removed during the operation of preparing the soil.

We do not claim the invention of a traveling planting-machine; nor do we claim the invention of hollow drills, concave cultivators, adjustable rollers, and chains, hoppers and revolving conveyers and conductors, as these have long been used; nor do we claim cogged and other gearing; but What we do claim as our invention, and desire to secure by Letters Patent, is—

1. The revolving manure breaker and pulverizer S', when placed in the front part of the hopper and in front of the revolving conveyer, in combination with the manure box or hopper, substantially as herein described, whereby the manure is broken, pulverized, and worked to a suitable degree of fineness for being conveyed into the jointed conducting-tube along with the seed to be planted, as described, thus dispensing with the services of the attendant, whose duty has heretofore been to agitate and break up the manure in the hopper with a fork or other implement and discharge the same into the concave of the revolving conveyer during the progress of the machine.

2. The particular form of the front or cutting part of the drill R, as above described, as combined with a separate adjustable jointed beam, W, and conducting-tube $q$, passing through the same.

OLIVER REYNOLDS.
RICHARD CRAGGS.

Witnesses to the signature of Oliver Reynolds:

WILLIAM P. ELLIOT,
ALBERT E. H. JOHNSON.

Witnesses to the signature of Richard Craggs:

CORNELIUS BREWER,
WILLIAM FLEMING.